United States Patent

Coco et al.

[15] 3,645,768
[45] Feb. 29, 1972

[54] FOAMABLE RESINOUS MATERIALS

[72] Inventors: Charles E. Coco, Shillington; Suzanne M. Garszczynski, Reading, both of Pa.

[73] Assignee: Wyomissing Corporation

[22] Filed: Mar. 7, 1968

[21] Appl. No.: 711,438

[52] U.S. Cl. .................................. 117/8, 117/10, 117/11, 117/45, 117/62.2, 117/72
[51] Int. Cl. ................................. B44d 5/00, B32b 5/18
[58] Field of Search ................. 117/8, 10, 11, 45, 72, 62.2; 252/307, 350; 260/2.5 P; 264/47, 45, 54, 48

[56] References Cited

UNITED STATES PATENTS

| | | | |
|---|---|---|---|
| 2,847,395 | 8/1958 | Wear | 161/160 |
| 2,851,735 | 8/1958 | Hogg et al. | 260/2.5 |
| 3,147,975 | 9/1964 | Gruss et al. | 161/160 |
| 3,166,433 | 1/1965 | Baumann et al. | 117/36.8 |
| 3,167,445 | 1/1965 | Baumann et al. | 117/36.9 |
| 3,433,700 | 3/1969 | Migdol et al. | 161/160 |

OTHER PUBLICATIONS

Wright, In Modern Plastics Encyclopedia, ed. McCann, New York, Vol. 40, No. 1A Pg. 410–412.

*Primary Examiner*—Alfred L. Leavitt
*Assistant Examiner*—M. F. Esposito
*Attorney*—Richard O. Church

[57] ABSTRACT

A foamable resin system is provided that is especially adapted to be applied to a substrate in the form of a smooth, flexible, nontacky coating. The system has a unique combination of properties including a long shelf life, the ability to be foamed at relatively low temperatures (for example, below the softening or mobility point of the base resin), and the ability to rigidify at temperatures approximating foaming temperatures. The invention makes use of plasticizers for the resin that are inactive or inactivated at ambient temperatures, that are effective to soften the resin at foaming temperatures, and that may be dissipated or otherwise pacified at foaming temperatures.

3 Claims, 4 Drawing Figures

PATENTED FEB 29 1972 3,645,768

INVENTOR.
CHARLES E. COCO
SUZANNE M. GARSZCZYNSKI
BY
Richard O. Church
ATTORNEY

FOAMABLE RESINOUS MATERIALS

BACKGROUND OF THE INVENTION

1. Field of the Invention

This invention relates to foams and, more particularly, to foamable resin systems that may be foamed at comparatively low temperatures. The invention is suitable for use, for example, in coatings that may be foamed in situ on a substrate such as may be desirable in providing insulating foamed labels for food containers.

2. Description of the Prior Art

The use of foamed resins has become commercially significant. Due to their low weight, inexpensiveness and ability to absorb shock, these foams are quite useful as packaging materials. Also, they are used as insulating materials when inexpensive, low-density materials are desired.

Conventionally, foams are prepared by adding a blowing agent to a resin, heating the resin to a temperature above which it softens or becomes mobile, and causing the blowing agent to volatilize or decompose into gaseous products that will expand the mobile resin.

Sometimes the foaming or blowing agent is mixed directly into a mass of resin and the mass is then foamed. Other times, discrete particles of expandable beads are first prepared and the beads are then expanded within a mold to form the desired article.

It can easily be understood that in order to obtain good foaming, the resin must be in a softened condition. For convenience herein, the resin will be considered sufficiently softened to provide satisfactory foaming if, upon such foaming, it will expand to at least twice its bulk. The temperature at which this expansion can take place will be referred to herein as the "mobility temperature," and the term "mobile resin" will be used to refer to a resin that is at this temperature.

In some instances it is desirable to foam resins at comparatively low temperatures or at temperatures closely approximating those at which the foamed coating is to be used or handled. In these instances, it is necessary that the foam become rigid and noncollapsible at or closely approximating the temperature at which the foaming takes place. For example, if the substrate to which the foam is applied is heat sensitive, it may be necessary to foam the resin at comparatively low temperatures below that at which the substrate will degrade. However, imposes the foamed system for which the prior art presents no reasonable solution. The reason for this lies in the fact that if the resinous system becomes mobile at low temperatures to enable expansion and foaming, it will tend to remain mobile or softened at these low temperatures and, therefore, subsequent handling may collapse or otherwise deteriorate the foam.

The invention can best be understood with respect to prepared foods that are consumed directly from the container in which they are packaged. Therefore, for clarity of description, the invention will be described herein primarily in the context of these systems, though it should be understood that the invention is not so limited.

Fully prepared foods are becoming increasingly popular, which, in some instances, are intended to be eaten from the container in which they are packaged. One common example of this is the prepared foods, such as canned soups and the like, that are dispensed by automatic canteen equipment. Typical of this type of equipment are the canteens located in factories and office buildings which will dispense the prepared food when coins are deposited in the machine. If the prepared foods are intended to be eaten hot, such as canned soups and the like, the heat of the container and its contents is frequently too hot to be held in the hand when heated to palatable temperatures. Either the food must be transferred to another receptacle or the contents heated to a lesser, though less appetizing, temperature. Alternatively, it has been proposed to wrap the container with an insulating paper label that has a foamed backing, such as a layer of foamed beads. This, surprisingly, is attendant with considerably more difficulties than might at first be supposed.

It can be understood that it is undesirable to place a label on a food container until the food has been packaged within the container. This is true for a number of reasons. First, many food containers are sterilized before food stuffs are placed in them. Since the sterilization may take place in a hot, humid atmosphere, any paper label that is placed on the can prior to sterilization may be damaged and the effectiveness of the adhesive system largely destroyed. Second, if the label is placed on the container prior to the time it is filled, various automated handling equipment can tear or otherwise scuff the label. Third, if the label is placed on the container prior to filling, the label may be soiled in handling or by spillage of the contents as the container is being filled.

Since the container, in best practice, should be filled prior to the time a label is attached, it would seem reasonable to prepare a foamed label and attach the foamed label to the container. This is not a satisfactory solution since it considerably complicates certain process and manipulation steps required in printing, cutting, attaching the labels, and the like.

Labels ordinarily are prepared by printing a plurality of labels on a single sheet or roll of paper. After the roll or sheet has been printed, it is cut or otherwise subdivided into the individual labels that are attached to the container. If the paper stock is foamed prior to printing or attaching the label, the added thickness, slight irregularity, and compressibility imparted to the surface of the paper makes it difficult to print cleanly over the surface of the paper and to handle the paper as in feeding it to the printing press and through automatic label-attaching equipment. Also, especially if the foamed coating is prepared from expandable beads, the foamed structure is somewhat fragile or friable, and machine handling of the label can fracture or otherwise collapse the foam.

To avoid these complications of the prior art, it is herein proposed that a thin, flexible, nontacky, foamable resinous coating be applied to one side of a web or sheet of paper. Since the coating is thin, flexible and nontacky, it can be handled in conventional processing equipment without difficulty. The sheet or web, after it has been printed, may be cut to size and individual labels prepared. These labels are then attached to a container after the container has been filled, and at this time, the resinous coating caused to foam in situ to yield the desired insulating properties.

In order to accomplish this in situ foaming, the foamable resinous system must be carefully formulated. First, it can be understood that the system must have a long shelf or storage life so that it will not deteriorate or foam while held in prolonged storage. Second, the foamable resinous system must be capable of being foamed at relatively low temperatures. High temperatures that may cause thermal degradation of the paper label cannot be tolerated, and temperatures in excess of the boiling point of the liquids may not be used after the can is sealed as the vapor pressure within the container could deform or explode the container. Thus, the second requirement that must be met in formulating these coatings is that they must be capable of being foamed, for practical purposes, at temperatures that are only slightly in excess of the boiling point of water or other liquid within the container.

Third, the foam must be made rigid at temperatures in the same range at which the label is foamed. It can be understood that since the foaming temperatures may closely approximate the temperatures at which the containers will be stored or are to be heated prior to consumption, the temperature differential between the blowing temperature and the temperature of storage or use is quite small. For example, in the case of a can of soup, it is necessary to foam the label in situ at a temperature somewhat under the boiling point of water—that is, less than about 100° C. On the other hand, the soup, to be palatable, should be heated to a moderately warm temperature such as 60° C. Thus, there is only a temperature differential of about 40° C. between the temperature at which the system must foam and the temperature at which the foamed system is to be handled and used. This presents a difficult formulation problem since, essentially within the same temperature range, the resinous system must both be capable of being made mobile and also be made capable of being made rigid.

SUMMARY OF THE INVENTION

Accordingly, it is an object of this invention to provide a foamed system that will become rigid at or slightly below the temperature at which it is foamed.

Still a further object of this invention is to provide a label that may be foamed in situ on a container at temperatures less than the boiling or deterioration temperature of the contents within the can and which will become rigid or noncollapsible under ordinary conditions of use at or slightly below the temperature at which the label is foamed in situ.

Still a further object of this invention is to provide a foamable resin system that may be coated onto one side of a paper substrate to provide a smooth, flexible, nontacky coating having a long shelf life.

Briefly, these and other objects of this invention are attained by including a plasticizer within the resin that is inactive or inactivated at room temperature, that is effective to render the resin mobile at the temperature at which it is to be blown, and that can be passivated at blowing temperatures. For example, in the case of thermoplastic resins, this is accomplished either by utilizing a latent plasticizer that volatilizes or decomposes at foaming temperatures or by providing a second unplasticized resinous coating layer into which a portion of the plasticizer may migrate. In the case of thermosetting resins, a plasticizer may be selected that is effective to plasticize the uncured resin at foaming temperatures but which will become ineffective as a plasticizer after the thermosetting resin has been cured and/or will volatilize or decompose.

DESCRIPTION OF THE DRAWINGS

In FIG. 1, a foamable label 11 is illustrated as being comprised of a paper substrate 12 coated with a foamable resin 13. The foamable resin 13 is comprised of a resin, a plasticizer for the resin at blowing temperatures, and a blowing agent.

FIG. 1a illustrates the label 11 after it has been foamed. The paper substrate 12 remains unaltered but the foamable layer 13 has been foamed and expanded considerably to form an insulating layer 13a. The plasticizer utilized in this system may decompose into a volatile gas at blowing temperatures to provide the rigid, uncollapsible foam.

FIG. 2 illustrates the label 11 21 in which a paper substrate 22 is coated with a foamable resin 23. The foamable resin 23 is coated with a comparatively unplasticized resin 24 that is able to receive and accept the plasticizer of the foamable layer 23 at foaming temperatures.

FIG. 2a illustrates the foamable label of FIG. 2 after it has been foamed. Here the paper substrate 22 remains unchanged but is now covered with a heat insulating expanded layer 23a. The expanded or foamed resin 23a becomes rigid and uncollapsible due to the fact that a significant portion of the plasticizer migrates, at foaming temperature, into the plasticizer-receptive resin layer 24.

EXAMPLE I

Figure 1:
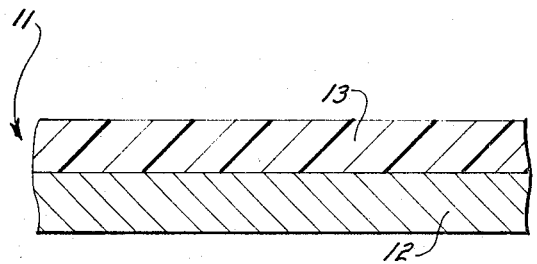
FIG. 1 is a schematic view, in section, of a foamable label prepared in accordance with this invention.
Figure 1A:
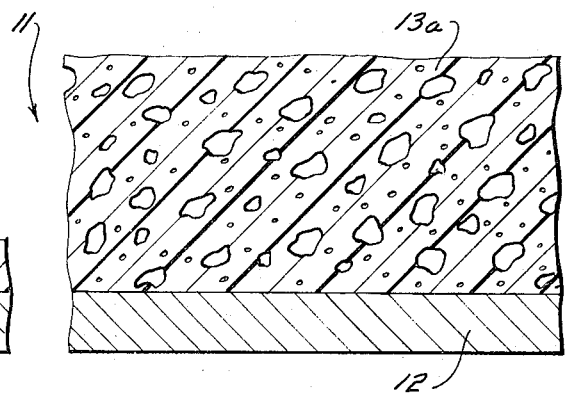
FIG. 1a is a schematic view, in section, of the label of FIG. 1 after it has been foamed.
Figure 2:
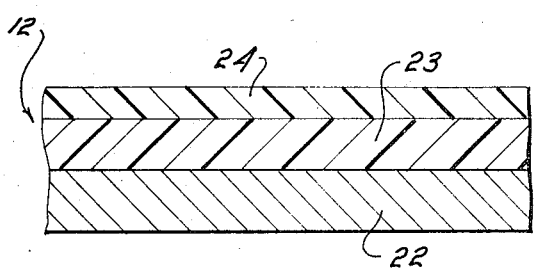
FIG. 2 is a schematic view, in section, of a foamable label prepared in accordance with this invention.
Figure 2A:
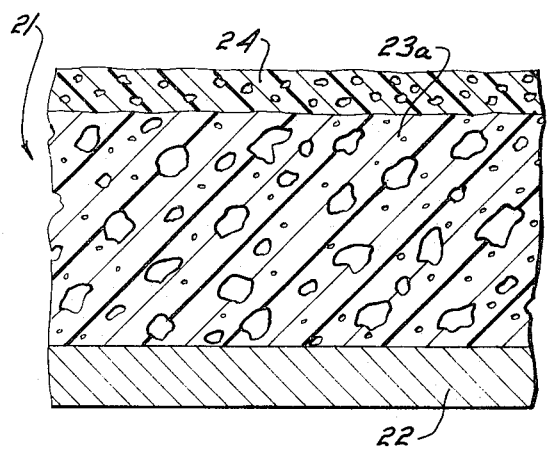
FIG. 2a is a schematic view, in section, of the label of FIG. 2 after it has been foamed.

A coating adapted to be applied from solution containing a resinous, film-forming component and a blowing agent was prepared. First, the following ingredients were mixed together in a ball mill:

| | |
|---|---|
| Ammonium carbonate | 19.3 |
| nuosperse 657 | 1.0 |
| Polystyrene | 2.9 |
| Ethyl acetate (solvent) | 29.0 |
| Toluene (solvent) | 14.5 |

The above ingredients were milled together for a period of about 2½ hours until such time as the particle size of the ammonium carbonate was reduced to below about 1 micron. To insure that the ammonium carbonate did not decompose, the temperature was maintained below 50° C. during mixing.

After the ammonium carbonate had been thoroughly dispersed, an additional solution comprised of the following was added:

| | |
|---|---|
| Polystyrene | 50.0 |
| Ethyl acetate | 33.4 |
| Toluene | 16.3 |

To the above solution there was then added a predissolved solution comprised as follows:

| | |
|---|---|
| Diphenyl phthalate | 15.0 |
| Ethyl acetate | 35.0 |
| Paraplex G–60 | 1.5 |

The above solution was applied to a paper substrate by means of a Bird applicator and dried below 50° C. The dried coating was approximately 1⅓ mils in thickness.

Over the above plasticized resinous base coat containing the blowing agent, a second coating layer was applied from solution free from any blowing agent or plasticizer. The solution had the following composition:

| | |
|---|---|
| Polystyrene | 33.3 |
| Ethyl acetate | 44.5 |
| Toluene | 22.2 |

This second coat was also dried at temperatures below 50° C. and when dry was approximately two-thirds mil in thickness, so that the total of the two coatings was approximately 2 mils.

Examination of the coating on the paper substrate revealed that, at room temperature, it was flexible, smooth and nontacky. As such, no difficulties were encountered in handling the paper in various paper-handling equipment, nor were any problems encountered in printing on the uncoated side of the paper substrate.

Samples of the paper substrate were then placed in an oven at temperatures varying from about 80° to about 120° C. After a few moments exposure to these temperatures, the samples were removed from the oven, and it was found that the ammonium carbonate had decomposed and that the base layer had been considerably expanded by foaming. The base layer was found to have expanded well over two times its original thickness and was measured about 6 to 9 mils in thickness. The unplasticized top layer free from blowing agents was, by visual observation, substantially unchanged.

When the paper substrates were removed from the oven, it was found that the foam was substantially rigidified and would not collapse under moderate pressures such as would normally be encountered in standard handling operations.

In order to take full advantage of the low blowing temperature of the ammonium carbonate (about 58° C.), it was necessary to cause the polystyrene to become mobile at temperatures considerably below those at which an unmodified polystyrene would be so mobile. This was accomplished by use of the plasticizer system. By use of these plasticizers, it was possible to cause the polystyrene to be mobile at temperatures above about 80° C.

As mentioned above, however, it is not only necessary that the polystyrene have mobility at temperatures above about 80° C., but also that the foam system be rigid below approximately the same temperature. In order to accomplish this, the second unplasticized coating layer was placed over the first layer so that the plasticizer could migrate from the foamed layer to the top layer. By such migration, a sufficient quantity of the plasticizer was removed from the foamed base coat so that the base coat would become rigid at or slightly below the foaming temperatures.

While the exact ratio of the thicknesses of the various coating layers is not too critical, it has been found that satisfactory results may be obtained if the unplasticized top coat is about 50% thick as the plasticized base coat. While for economy and other reasons it may be desired not to place a thicker top coat on than necessary, from the standpoint of the function of the invention, greater thickness of the top layer would not be detrimental.

EXAMPLE II

This example demonstrates another method for practicing this invention where, as an alternative to having the plasticizer migrate from one layer to another, a fugitive plasticizer is utilized that will decompose and, at least in part, leave the system at blowing temperatures.

The following ingredients were ball milled together:

| | |
|---|---|
| Ammonium carbonate | 19.3 |
| Nuosperse 657 | 1.0 |
| Polystyrene | 2.9 |
| Ethyl acetate | 29.0 |
| Toluene | 14.5 |
| Ethylene diamine-Bisphenol A | 10.0 |

The ethylene diamine-Bisphenol A is a cocrystal that is a solid at room temperature but that is unstable at blowing temperatures. The decomposition products of this material at blowing temperatures are ethylene diamine, that is effective as a plasticizer, and Bisphenol A that, for practical matters, can be considered inert in this system.

The cocrystal of ethylene diamine-Bisphenol A was prepared as follows. Bisphenol A was dissolved in toluene and liquid ethylene diamine was added with stirring in sufficient quantity to provide approximately a 1:1 molar solution of Bisphenol A to the diamine. The complex cocrystal forms and begins to precipitate almost immediately. The rate of precipitation can be increased by cooling. The precipitate was collected on a filter and washed with hexane.

The above-described mixture was placed in a ball mill and milled at temperatures below 50° C. until such time as all of the solids were reduced in particle size substantially below 1 micron. This dispersion was mixed with a predissolved mixture comprised of:

| | |
|---|---|
| Polystyrene | 50.0 |
| Ethyl acetate | 33.4 |
| Toluene | 16.3 |
| Diphenyl phthalate | 10.0 |
| Paraplex G–60 | 1.5 |

The above mixture was then coated over a substrate as in Example I to form a layer about 2 to 3 mils in thickness.

The coated layer was dried at temperatures below about 50° C. and it was found to have formed a flexible, nontacky, smooth layer. As was the case in Example I, this coating on the paper did not interfere with handling operations or various printing processes.

The coated paper was then placed in an oven at temperatures variously ranging from about 80° to 120° C. The coated paper was left in the oven for a period of time sufficient to enable the ammonium carbonate and the cocrystal to decompose. The sample was then removed from the oven and it was found, even at oven temperatures, that an effective foam layer had been formed that was sufficiently rigid so that it could be handled without causing the foam to collapse.

In this example, it should be noted that the two plasticizers—that is, the diphenyl phthalate and the Paraplex G–60—were not added in sufficient quantities to render the polystyrene tacky at room temperature nor to give it mobility at blowing temperatures. Thus, to obtain the desired mobility at blowing temperatures, still further plasticization was required. In this case, the additional plasticization is achieved through the release of liquid ethylene diamine from the cocrystal. Since the diamine has a moderately high vapor pressure at blowing temperatures, some of the ethylene diamine will volatilize during expansion, thus enabling the formed system to begin to rigidify even at blowing temperatures.

In the above examples, the polystyrene used was a commercially available material sold under the trade designation Dylene No. 8. This is a molding grade unmodified polystyrene. Its physical properties, as given by the manufacturer, are as follows:

| | |
|---|---|
| Specific gravity | 1.05–1.06 |
| Tensile strength | 8,500–9,500 p.s.i. |
| Tensile elastic modulus | 400,000–500,000 |
| Ultimate elongation | 2.5–3.5% |
| Flexural strength | 12,000–14,000 p.s.i. |
| Flexural elastic modulus | 425,000–525,000 |

In the above examples, thermoplastic resins were used. Similar systems can be designed for use with thermosetting resins by utilizing latent materials that will plasticize the uncured resin but will be substantially ineffective to plasticize the cured resin. If the curing temperature and the blowing temperature are the same, it will be understood that the foamed system can become rigid at foaming temperatures since the plasticizer will have little effect upon a cured or cross-linked resin.

The following is illustrative of the utility of this invention when a heat-curable resin is used. An epoxy resin may be selected comprised of Bisphenol A and epichlorohydrin, as represented by the following formula:

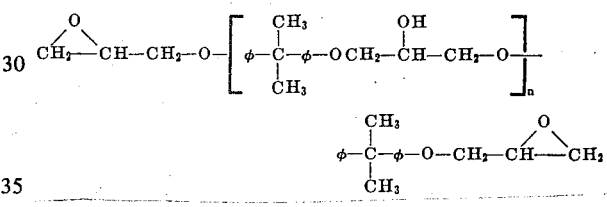

in which n is greater than 1 in order that the resin be solid at room temperature. An example of such a resin is one sold under the trade name Araldite 7065 by Ciba Products Company. This resin has a melting point of between 68° C. and 78° C. and a weight per epoxide of 455 to 500. A solution of this epoxy resin can be prepared as follows:

| | |
|---|---|
| Solid epoxy resin | 50 |
| Toluene | 25 |
| Methylene chloride | 25 |
| Paraplex G–60 | 2 |

To this may be added a mixture comprised of the following ingredients that are ball milled together to reduce all solids to particle sizes less than one micron:

| | |
|---|---|
| Ammonium carbonate | 19.3 |
| Nuosperse 657 | 1.0 |
| Polystyrene | 2.9 |
| Ethyl acetate | 29.0 |
| Toluene | 14.5 |
| Ethylene diamine-Bisphenol A | 10.1 |

The above mixture contains the blowing agent as well as a minor amount of polystyrene that may be a useful addition for its film-forming characteristics. The ethylene diamine-Bisphenol A may be prepared as outlined in Example II. When this cocrystal decomposes at blowing temperatures, the ethylene diamine performs three functions. First, it plasticizes the resin so that it will become mobile. Second, the diamine is a curing agent for the epoxy. Third, since the diamine has a high vapor pressure, it may contribute to the action of the blowing agent and, at least in part, leave the system by volatilization.

As in Examples I and II, the epoxy system may be coated onto a paper substrate and, after the solvent has been evaporated, the paper substrate may be heated in an oven to temperatures of between about 80° to 120° C., in which temperature range both the ammonium carbonate and the ethylene diamine-Bisphenol A crystal will decompose. Since the temperatures are in excess of the melting point of the uncured epoxy resin and due to the presence of the ethylene diamine as the plasticizer (as well as other plasticizers in the system), the resin system will be sufficiently mobile to provide for the production of a satisfactory foam. The diamine will also cure the epoxy and a rigid foam will be produced. It should also be noted that an epoxy system such as one set forth here will essentially have an unlimited shelf life due to the fact that the curing agent, that is, the ethylene diamine, is tied up as a cocrystal with the Bisphenol A. For this reason, the ethylene diamine is truly a latent curing agent since it will not be effective to cure the epoxy until a threshold temperature has been exceeded whereat the cocrystal releases the ethylene diamine.

As examples of other types of materials that may be useful as plasticizers at blowing temperatures but which will essentially be inactive as plasticizers at room temperature may be mentioned the following:

Di-n-hexylamine - 2,2'-methylene-bis-(4-methyl-6-tert butyl phenol)
Ethanolamine - tetrachlorobisphenol A
Cyclohexylamine - 4,4'-thio-bis-(6-test butyl-m-cresol)

The above cocrystals are useful with thermoplastics since the amine portion of the cocrystals becomes a liquid plasticizer at blowing temperatures. Further, since these liquid plasticizers have an appreciable vapor pressure at blowing temperatures, they will, by their volatilization, not only leave the system to enable rigidification of the foamed system, but, to some extent, they will also supplement the action of the blowing agent. If the base resins are epoxies, the amines will also serve as curing agents.

Additional materials that are solids at room temperature that will become plasticizers at elevated temperatures include the following:

Benzoyl acetic acid — This material decomposes in the range of 100° C. into benzophenone and carbon dioxide. The benzophenone is a liquid plasticizer at these elevated temperatures, and upon some cooling, will recrystallize and thus remove itself from the system to enable the foam to become rigid. The other product of decomposition, that is, the carbon dioxide, is, of course, useful as a blowing agent.

Still further examples of other materials that will decompose to form volatile fugitive plasticizer liquids are amyl boric acid and hexyl boric acid.

In the above description and examples, the base resin system has been exemplified by polystyrene and epoxy. As it will be readily apparent to those skilled in the art that many other resins will be effective in the practice of this invention, it is to be understood that such other resins are meant to be included within the scope of this invention. Essentially, the only requirement that the resin must meet is that it be capable of being made mobile by the use of heat and plasticizers at the desired blowing temperatures.

While not illustrated in the examples, it may be useful to include fillers in the resin systems to accomplish numerous purposes well known in the prior art. It is intended that the use of fillers be included within the context of this invention.

In the above examples and in the appended claims, all parts given are by weight.

Although certain embodiments of this invention have been shown in the drawings and described in the specification, it is to be understood that the invention is not limited thereto, is capable of modification, and can be rearranged without departing from the spirit and scope of the invention.

I claim:

1. A method for forming a foamed, heat-insulating layer, in situ, on a flexible, heat-sensitive substrate, comprising the steps of:
   applying a foamable mixture to the substrate, which mixture is comprised of:
   a heat-softenable, thermoplastic, film-forming resin having a mobility temperature in excess of 120° C.;
   a volatile organic solvent for the resin;
   a plasticizer for the resin that is effective above about 50° C. to reduce the mobility temperature of the resin to a temperature in the range of from about 50° to about 120° C.;
   a blowing agent that has a blowing temperature in the range of from about 50° to about 120° C.;
   volatilizing the solvent from the applied mixture to form a solid, flexible, nontacky film;
   heating the substrate to a reaction temperature which is above the blowing temperature of the blowing agent but below 120° C.; and
   maintaining the substrate at the reaction temperature for a time sufficient to:
   mobilize the resin;
   gasify the blowing agent; and
   drive the plasticizer, at least in part, from the resin, whereby the mobility temperature of the resin is increased and the foam becomes rigid at the reaction temperature.

2. A method according to claim 1 wherein the plasticizer is volatile at the reaction temperature.

3. A method according to claim 1 including the step of applying a substantially unplasticized resinous coating on the nontacky flexible film, the resinous component of the coating being selected from those resins which are plasticized by the plasticizer at the reaction temperature.

* * * * *